(12) United States Patent
Plummer et al.

(10) Patent No.: US 8,845,847 B1
(45) Date of Patent: Sep. 30, 2014

(54) ACCELERATED LOW TOXICITY METHOD OF MAKING A COMPOSITE DOOR

(71) Applicant: Glasscraft Door Company, Houston, TX (US)

(72) Inventors: John B Plummer, Houston, TX (US); Joseph Gene Denley, Houston, TX (US)

(73) Assignee: Glasscraft Door Company, Houston, TX (US)

( * ) Notice: Subject to any disclaimer, the term of this patent is extended or adjusted under 35 U.S.C. 154(b) by 12 days.

(21) Appl. No.: 13/848,582

(22) Filed: Mar. 21, 2013

(51) Int. Cl.
*E06B 5/00* (2006.01)
*C09J 175/04* (2006.01)
*B32B 37/02* (2006.01)
*B32B 37/12* (2006.01)
*B29C 65/48* (2006.01)
*E06B 3/70* (2006.01)

(52) U.S. Cl.
CPC ......... B32B 37/02 (2013.01); *E06B 2003/7023* (2013.01); B32B 37/12 (2013.01); C09J 175/04 (2013.01); E06B 5/00 (2013.01); *B32B 2309/04* (2013.01); B29C 65/48 (2013.01)
USPC ..... 156/308.8; 156/313; 156/314; 156/331.4; 156/331.7

(58) Field of Classification Search
CPC ... E06B 5/00; E06B 2003/7023; B32B 37/02; B32B 37/12; B32B 2309/02; B32B 2309/04; B29C 65/48; C09J 175/04
USPC ................ 156/313, 314, 331.7, 308.8, 331.4
See application file for complete search history.

(56) References Cited

U.S. PATENT DOCUMENTS

| | | | | |
|---|---|---|---|---|
| 6,125,608 A | * | 10/2000 | Charlson | 52/847 |
| 6,401,414 B1 | * | 6/2002 | Steel et al. | 52/309.6 |
| 2007/0113407 A1 | * | 5/2007 | Albertelli | 29/897.32 |
| 2010/0310823 A1 | | 12/2010 | Albertelli et al. | |

* cited by examiner

*Primary Examiner* — John Goff
*Assistant Examiner* — Scott W Dodds
(74) *Attorney, Agent, or Firm* — Buskop Law Group, PC; Wendy Buskop

(57) ABSTRACT

A low pressure, low toxicity method of making a composite door, and a door formed from the method involving the steps forming a door frame; installing a foam block within the door frame; applying a thin coating of 1 millimeter to 4 millimeters of an water activated adhesive made of isocyanate and an alkylating agent edge to edge on a front and back side of the door frame and foam block and then within a few seconds or minutes of applying the adhesive, misting the adhesive; then placing the door frame and foam block with adhesive on a back skin then overlaying a front skin on an opposite side forming a door assemblage; and applying low pressure and low heat to the door assemblage to form the composite door.

15 Claims, 3 Drawing Sheets

ACCELERATED LOW TOXICITY METHOD OF MAKING A COMPOSITE DOOR

FIELD

The present embodiments generally relate to a door, and a method of making a low toxicity composite door. More particularly, the present invention relates to a door, with low heat and low pressure to produce a composite door.

BACKGROUND

Typically a tremendous amount of heat and pressure are needed to make fiberglass doors.

A need exists for a low heat, low pressure, low toxicity method to make a composite door, such as a fiberglass door that has strength.

The present embodiments meet these needs.

BRIEF DESCRIPTION OF THE DRAWINGS

The detailed description will be better understood in conjunction with the accompanying drawings as follows.

Figure 1:
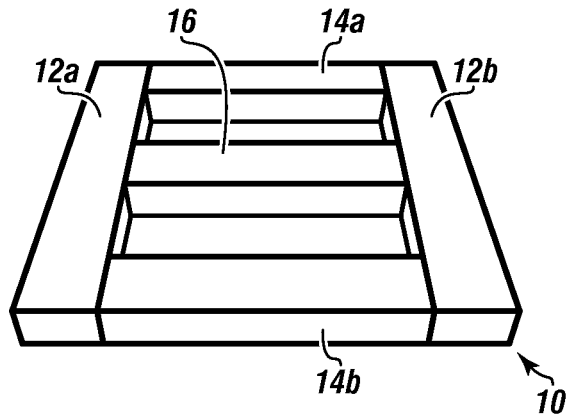
FIG. 1 is a perspective view of the frame used to create the composite door according to an embodiment of the present invention.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

Synthetic doors have become commonplace as a replacement for the traditional wooden doors in residences and other building applications. Such doors can include graining on the surface of the doors and simulated profiled door panels which give the doors the appearance of a natural wood fabricated product.

Often such synthetic doors are formed of fiberglass skins, attached to or adhesively applied to opposite sides of a rectangular frame forming the stiles and rails of the door with a resulting cavity between the frame.

Traditionally the cavity is then filled with an expanding urethane foam. This process traditionally requires approximately 75 minutes over several steps.

This urethane injection method has several problems, and the present invention overcomes these problems.

The present invention allows a fast, low toxicity method to make composite doors using easy install of foam without creating empty void areas between the foam and the skins, and without creating void areas between the foam and the frame.

The present invention eliminates design flaws including unwanted dips or dents in the fiberglass door skin due to the dips or dents created while the urethane expands to fill the cavity between the frame.

The present invention reduces the time to produce a fiberglass door by 50 percent to about 20 minutes or even 10 minutes, in some cases.

The present invention does not involve an exothermic reaction of liquid urethane as it expands. The invention prevents the possibility of burns to workers from the exothermic reaction. First, second, and third degree burns can be avoided with the present invention.

The present invention does not involve emission of volatile organic compounds (VOC) during the processing, thereby providing a more environmentally friendly production of doors, protecting the air exposed to the workers and the atmospheric air quality in general.

The present invention only requires 6 steps to form the door, without the need for a heat and high pressure press, as required in the urethane injection with exothermic reaction method.

Other methods to make doors include techniques which attach fiberglass skins to a STYROFOAM® insert after the STYROFOAM® insert is first heated and pressed to create the indentations required by the door skins.

Unlike the STYROFOAM® method, the present invention requires no impressing or machining of the foam block insert prior to insertion in the frame.

Unlike the STYROFOAM® method, the adhesive is applied to the entire foam and frame; not just the foam portion which is not indented or raised. In the present invention the adhesive covers the entire foam block insert, resulting in continuous adhesive adhering to both the foam and the skins contiguously and without gaps.

Also, doors made by the STYROFOAM® method and the liquid urethane method do not break down easily in a landfill. The present invention can enable the inventive doors to break down more easily in a landfill.

In embodiments, the invention includes a low pressure, low toxicity method of making a composite door, and the door.

The method can include forming a door frame and installing a foam block within the door frame without using a liquid resin that produces volatile organic compounds (VOC) when forming a door frame assembly.

The method can include applying a thin coating of 1 milliliter to 4 milliliters of a rapid curing water initiated adhesive curable in less than 8 minutes at ambient temperatures to a front side of the door frame assembly and to the back side of the door frame assembly.

The rapid curing water initiated adhesive can consist of 10 weight percent to 20 weight percent of an isocyanate, based on the total weight of the adhesive, which in embodiments can be 4,4 diphenylmethane diisocyanate and 1 weight percent to 4 weight percent based on the total weight of the adhesive of an alkylating agent which can be benzyl chloride. The adhesive is applied onto the door frame assembly from edge to edge covering the foam block and frame. In some embodiments, the adhesive can be applied to both sides of the door frame assembly simultaneously.

Once the adhesive is applied, and typically within 5 seconds to 5 minutes of applying the rapid curing water initiated adhesive, misting of the adhesive with water can be performed.

The next step of the method can include positioning and depositing the door frame assembly with misted adhesive onto a back skin and overlaying a front skin on a front side of the misted adhesive of the door frame assemblage on an opposite of the door frame assembly; forming a door assemblage. The door frame assembly can be adhered to the skins with 10 seconds to 3 minutes of misting.

In embodiments, the front skin can have a first pattern and the back skin can have a second pattern, to create a wood-like appearance on the front that is different from the wood-like appearance found on the back skin.

The door assemblage can be rolled into a low pressure press for the application of a temperature from 50 degrees Fahrenheit to 250 degrees Fahrenheit to the door assemblage and at pressure from 2 psi to 80 psi; forming a low toxicity assembled composite door in less than 180 minutes without producing additional volatile organic compounds (VOC).

The invention includes a door made by the above method.

In an embodiment of the method, a flat block of urethane foam can be inserted into the door frame.

Adhesive can be applied to the door frame and the foam block insert.

Two fiberglass door skins can be placed on a front side and a back side of the door frame and foam block.

A hot platen press at low psi can be used to press the door skins into the foam, creating a crosslinking reaction between the adhesive and the foam forming a reactive layer of between ⅛th and ½ inch into the foam and along all surfaces of the door skins and frame.

This sequence of steps eliminates the need to process foam before assembling the door to match needed door profiles.

The method eliminates any processing of the foam block insert to create the profiles of the door skins, saving time and labor costs when making the door.

This method creates a door with door skins that are completely secured to the foam; without any areas omitting a coating of adhesive, resulting in a stronger door.

This method takes about 30 seconds to cut the foam, or can use precut foam, rather than from 8 minutes to 20 minutes it normally takes to allow a polyurethane foam to expand and cure in a door space.

The present invention allows the door skins to have a thickness from 1.5 millimeters to 3.5 millimeters.

The present invention depicts that the door skins are generally 10 inches to 48 inches wide.

The present invention depicts that the door skins could have a curved top to form an arch top door.

In embodiments, the door skins are generally 78 inches to 100 inches in height.

Turning to the Figures, FIG. 1 is a perspective view of a door frame used to create the composite door according to an embodiment of the present invention.

The door frame 10 can be produced using wood, metal, plastic, or a combination thereof. The metal can be aluminum. The plastic can be fiberglass.

The door frame 10 consists of four pieces of material connected at each corner.

The long edges are first and second sides 12a and 12b.

The short edges are third and fourth sides 14a and 14b.

The third and fourth sides can be between the first and second sides in this embodiment. However, the first and second sides can also be between the third and fourth sides. In still another embodiment, the sides can simply meet at corners.

The door frame sides can each have a thickness measured from the front to the back of the door from 28 millimeters to 64 millimeters thick.

The door frame can measure approximately the same size as the door skins to be used during assembly.

The door frame can have a central cross member 16 located between the first and second sides, as shown in these Figures.

In other embodiments, one or more cross members can be used between the third and fourth sides. The addition of this central cross member 16 can increase the structural strength of the assembled door.

Figure 2:
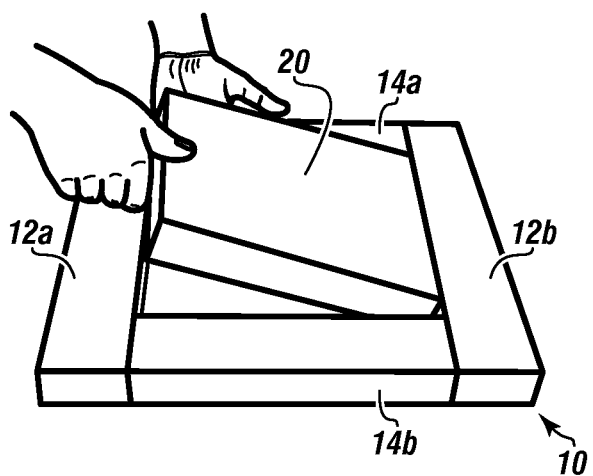
FIG. 2 is a perspective view of the frame of FIG. 1 with the foam block insert.

FIG. 2 is a perspective view of the door frame of FIG. 1 with the foam block insert 20. If the central cross member 16 is used, then two foam block inserts would be used in the space formed between the sides and the central cross member.

The foam block insert 20 can have a density of 1.4 pounds to 8 pounds per cubic foot.

This method allows insertion of the foam block insert 20 in the shape and with cavities or indentations as needed which have been pre-formed in the foam block. When the cavities are formed during formation of the foam block, the cost of labor from forming the cavity is reduced as well as greatly reducing foam waste and foam trash.

An embodiment of the invention, the foam block insert 20 can be a "biofoam" produced from agriculturally grown renewable polyols, using water as the blowing agent, such as foam from soy.

A biofoam foam insert block has the advantage of not giving off as a harmful gas, such as volatile organic compounds during fabrication or after installation. A study commissioned by the U.S. Department of Agriculture shows that every pound of biofoam used sequesters 2.6 pounds of $CO_2$; making it much better for the environment.

Polyurethane foam blocks can be used in the frame.

Figure 3:
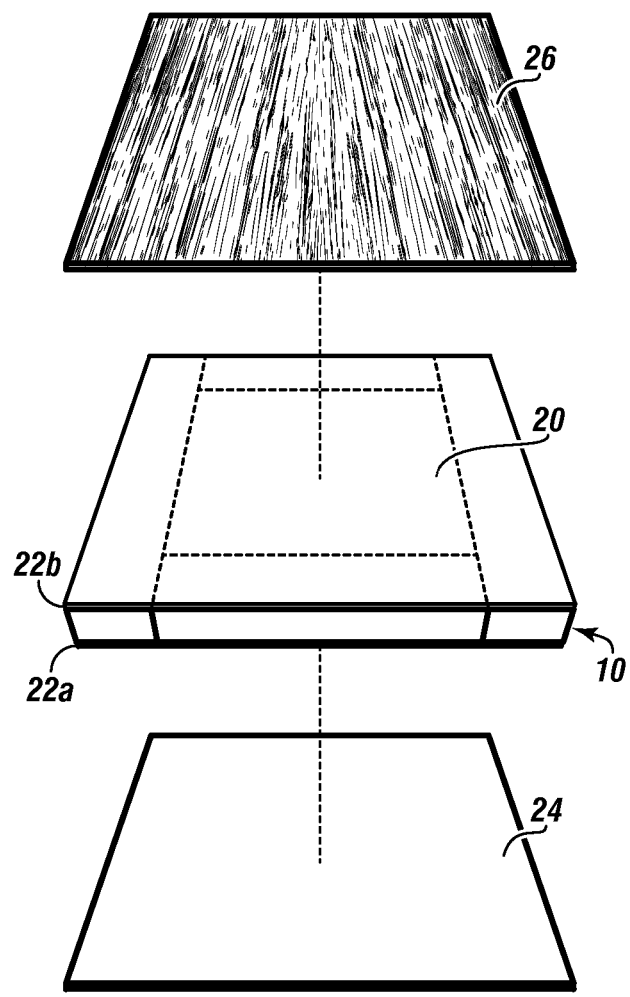
FIG. 3 is an exploded view of the components of the composite door according to an embodiment of the present invention.

FIG. 3 is an exploded view of the components of the composite door formed according to a method of the present invention.

This FIG. 3 depicts using a frame 10.

The Figure depicts the insertion of a foam block 20 into the frame 10, forming the door frame assembly.

The Figure depicts the placing of a polyurethane adhesive 22a onto a first side of the door frame assembly. Usable polyurethane adhesives can include single component water activated isocyanate adhesives.

An embodiment can also include the placing of a second polyurethane adhesive (not shown) on a second side of the door frame assembly.

The polyurethane adhesives can be applied to the door frame assembly using a double sided glue spreader.

To form the door, rollers of the glue spreader can apply a specific amount of isocyanate adhesive. The top and bottom rollers of the spreader can be rubber with a durometer of 60 enabling an even application of the water curable adhesive.

The adhesive can be applied at a rate of from 10 grams to 14 grams per square foot, such as 12 grams per square foot.

The adhesive can be an ISOGRIP™ SP 7250D made by Ashland Chemical Adhesives usable herein have a viscosity, Brookfield cps, of 15,000 to 20,000 at 10 rpm and 25 degrees Celsius and a flash point greater than 200 degrees Fahrenheit.

In embodiments, a single component can be used, such as 100 percent solids polyurethane adhesive that allows easy, rapid deployment, as well as long term durability.

The adhesive can be one that is applied using a roll coater or a spray coating system, but other types of application systems can be used.

After the polyurethane adhesive is applied to the door frame assembly the adhesive can be misted with water for reaction, forming the door assemblage.

In embodiments, the water mist can be applied at a rate of 1.5 $g/ft^2$ to 3 $g/ft^2$ over the adhesive, such as at 2.0 $g/ft^2$.

A usable adhesive can include a water cured isocyanate that can be a diisocyanate or a polyisocyanate. In embodiments, the isocyanate can be a 4,4-diphenylmethane diisocyanate or a poly(methylenephenylene) polyisocyanate.

Additionally an alkylating agent, such as benzoyl chloride can be added to the isocyanate for fast cure and good bonding.

In embodiments, 10 weight percent to 20 weight percent, such as 18 weight percent 4,4 diphenylmethane diisocyanate, and 1 weight percent to 4 weight percent, such as 3.3 weight percent benzyl chloride, can be used in the adhesive.

Water initiates curing of the adhesive.

Water usable herein can be tap water, demineralized water, deionized water, distilled water, spring water, water with up to 10 percent to 15 percent based on the total solution, of a non-toxic salt, or combinations thereof. The non-toxic salt can be sodium chloride, potassium chloride or combinations thereof.

Applying the appropriate amount of water is an important step in controlling the cure rate. Plant temperature also affects the cure rate of the adhesives, and ambient temperatures are preferred to create the composite door in an accelerated manner.

The water can be misted from a spray apparatus.

In embodiments, a 12 gram/ft$^2$ spread rate for the adhesive can use 2.0 g/ft$^2$ water mist applied over the adhesive in less than one minute open assembly time. "Open assembly time" is herein defined to be the amount of time elapsed from adhesive application until the skins are placed over the frame and foam block.

The water can be misted onto the surface of the frame and foam block, which can be referred to as the door frame assembly, at the rate of from approximately 1 gram to 4 grams per square foot, such as approximately 2 grams per square foot.

Other usable adhesives do not require water misting. Still other usable adhesives require a two-part catalyzed process.

It is important to place a front skin and a back skin on the misted door frame assembly in no more than 5 minutes, followed by the application of pressure. Front and back skins can be immediately applied to the misted adhesive on the door frame assembly in embodiments.

In embodiments, the back skin and the front skin can be simultaneously contacted with the rapid curing water initiated adhesive on the door frame assembly.

The door assembly can then be placed in a low pressure press.

The low pressure press can be a platen press in a horizontal or flat position, allowing heated platens to compress the door assemblage using a platen closure rate from 10 millimeters to 100 millimeters per second. In embodiments, the platen closure rate can be 28 millimeters per second.

In embodiments, the low pressure press can use from 7 psi to 40 psi of pressure on the door assemblage.

The platen press can use a press time from 3 minutes to 10 minutes at temperatures from 170 degrees Fahrenheit to 200 degrees Fahrenheit. In embodiments, the platen press can use a press time of 5 minutes to 10 minutes for temperatures from 170 degrees Fahrenheit to 180 degrees Fahrenheit.

Embodiments of the method can encompass the use of a residence time in the low pressure press of less than 2 hours for the door assemblage when the press temperature is from ambient temperature to 50 degrees Fahrenheit.

Embodiments of the method can further encompass the using of a residence time in the low pressure press of less than 3 minutes for the door assemblage when the press temperature is from 100 degrees Fahrenheit to 250 degrees Fahrenheit.

Higher temperatures above ambient will increase the rate of the chemical reaction and require a shorter assembly time. The open assembly time is recommended to be as short as possible.

The typical amount of pressure for pressing is from 2 psi to 80 psi, but low pressures from 10 psi to 40 psi can be used on 2 pcf foam.

A typical press time for the door frame assembly is 2 hours for temperatures from ambient temperature to 50 degrees Fahrenheit, such as 76 degrees Fahrenheit and 80 degrees Fahrenheit.

A front door skin 26 over the frame and foam block can have a wood grain side facing away from the frame and foam block.

In embodiments, the foam block can be identical to the same thickness as the frame sides.

A back skin 24 can be placed over the frame and foam black with a wood grain side or other pattern facing away from the frame and foam block.

The skins, once deposited over the frame and foam block, can be moved into a platen press.

The press platens can close and compress the two door skins over the frame and foam block assembly for a period of time to allow the adhesive to cure.

Both platens can be heated in embodiments.

Typical press time, which is also termed "dwell time under pressure," is 1 hour to 3 hours, such as 2 hours, at a temperature from 76 degrees Fahrenheit to 80 degrees Fahrenheit. This dwell time can be shortened considerably with the application of heat.

Typical press time is 3 minutes to 10 minutes at temperatures from 170 degrees Fahrenheit to 200 degrees Fahrenheit.

Minimum press platen temperature is 50 degrees Fahrenheit.

Maximum press platen temperature is 250 degrees Fahrenheit.

The door skin/frame/foam assembly can roll into the platen press in a horizontal or flat position in an embodiment.

The platens can compress the door skin/frame foam assembly using a platen closure rate from 10 millimeters to 100 millimeters per second.

The platens can be heated with electricity or hot oil.

The process in production, can utilize approximately 30 psi in the press. It is possible that up to 80 psi can also be usable herein.

These steps are low pressure compression.

The entire door assembly process according to this method can take 8 minutes to 12 minutes per door when the door assemblage is heated; however up to 2 hours can elapse when no heat is used.

Figure 4:
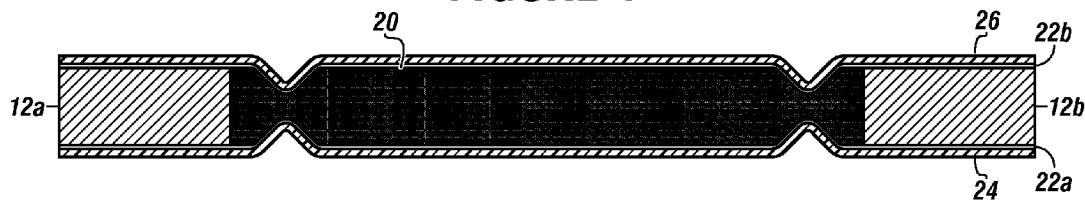
FIG. 4 is a detailed cross-sectional view of the door of FIG. 3.

FIG. 4 is a detailed cross-sectional view of the door of FIG. 3 showing the frame long sides 12*a* and 12*b*, the foam block 20, the two layers of adhesive 22*a* and 22*b* and the door skins 24 and 26.

The created composite door is energy efficient. There are no voids in the foam in the door.

The created composite door saves energy costs to manufacture since it uses less heat and less pressure than other systems.

Figure 5:
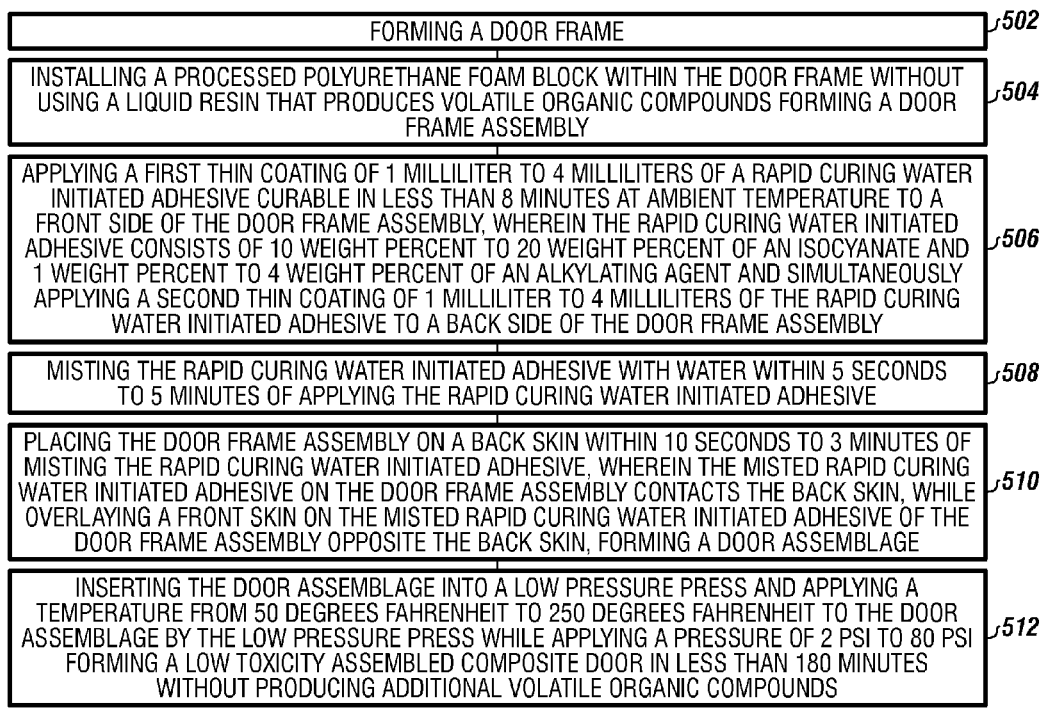
FIG. 5 is a detail of the steps of an embodiment of the method.

FIG. 5 is a detail of the steps of the method according to an embodiment of the invention.

The method can include forming a door frame, as shown in box 502.

The method can include installing a processed polyurethane foam block within the door frame without using a liquid resin that produces volatile organic compounds forming a door frame assembly, as shown in box 504.

The method can include applying a first thin coating of 1 milliliter to 4 milliliters of a rapid curing water initiated adhesive curable in less than 8 minutes at ambient temperature to a front side of the door frame assembly, wherein the rapid curing water initiated adhesive consists of 10 weight percent to 20 weight percent of an isocyanate and 1 weight percent to 4 weight percent of an alkylating agent and simultaneously applying a second thin coating of 1 milliliter to 4 milliliters of the rapid curing water initiated adhesive to a back side of the door frame assembly, as shown in box 506.

The method can include misting the rapid curing water initiated adhesive with water within 5 seconds to 5 minutes of applying the rapid curing water initiated adhesive, as shown in box 508.

The method can include placing the door frame assembly on a back skin within 10 seconds to 3 minutes of misting the rapid curing water initiated adhesive, wherein the misted rapid curing water initiated adhesive on the door frame assembly contacts the back skin, while overlaying a front skin on the misted rapid curing water initiated adhesive of the door frame assembly opposite the back skin, forming a door assemblage, as shown in box 510.

The method can include inserting the door assemblage into a low pressure press and applying a temperature from 50 degrees Fahrenheit to 250 degrees Fahrenheit to the door assemblage by the low pressure press while applying a pressure of 2 psi to 80 psi forming a low toxicity assembled composite door in less than 180 minutes without producing additional volatile organic compounds, as shown in box 512.

While these embodiments have been described with emphasis on the embodiments, it should be understood that within the scope of the appended claims, the embodiments might be practiced other than as specifically described herein.

What is claimed is:

1. An accelerated low toxicity method of making an assembled composite door, comprising:
    a. forming a door frame;
    b. installing a processed polyurethane foam block within the door frame without using a liquid resin that produces volatile organic compounds (VOC) forming a door frame assembly;
    c. applying a first thin coating of 1 milliliter to 4 milliliters of a rapid curing water initiated adhesive curable in less than 8 minutes at ambient temperature to a front side of the door frame assembly, wherein the rapid curing water initiated adhesive consists of 10 weight percent to 20 weight percent of an isocyanate and 1 weight percent to 4 weight percent of an alkylating agent and simultaneously applying a second thin coating of 1 milliliter to 4 milliliters of the rapid curing water initiated adhesive to a back side of the door frame assembly;
    d. misting the rapid curing water initiated adhesive with water within 5 seconds to 5 minutes of applying the rapid curing water initiated adhesive;
    e. placing the door frame assembly on a back skin within 10 seconds to 3 minutes of misting the rapid curing water initiated adhesive, wherein the misted rapid curing water initiated adhesive on the door frame assembly contacts the back skin, while overlaying a front skin on the misted rapid curing water initiated adhesive of the door frame assembly opposite the back skin, forming a door assemblage; and
    f. inserting the door assemblage into a low pressure press and applying a temperature from 50 degrees Fahrenheit to 250 degrees Fahrenheit to the door assemblage by the low pressure press while applying a pressure of 2 psi to 80 psi forming a low toxicity assembled composite door in less than 180 minutes without producing additional volatile organic compounds.

2. The method of claim 1, wherein the front skin comprises a first pattern and the back skin comprises a second pattern to create a wood-like appearance on the front that is different from the wood-like appearance on the back skin.

3. The method of claim 1, comprising using as the low pressure press, a platen press in a horizontal or "flat" position, allowing heated platens to compress the door assemblage using a platen closure rate from 10 millimeters to 100 millimeters per second.

4. The method of claim 1, wherein the low pressure press uses from 7 psi to 40 psi of pressure on the door assemblage.

5. The method of claim 1, wherein the adhesive is spread at a rate of 10 gram/ft$^2$ to 14 gram/ft$^2$ on each of the door skins.

6. The method of claim 1, wherein the water mist is applied at a rate of 1.5 g/ft$^2$ to 3 g/ft$^2$ over the adhesive.

7. The method of claim 3, wherein the platen press uses a press time from 3 minutes to 10 minutes at temperatures from 170 degrees Fahrenheit to 200 degrees Fahrenheit.

8. The method of claim 1, wherein the isocyanate is a diisocyanate or a polyisocyanate.

9. The method of claim 1, wherein the isocyanate is a 4,4, diphenylmethane diisocyanate.

10. The method of claim 1, wherein the alkylating agent is a benzyl chloride.

11. The method of claim 1, wherein the water is tap water, demineralized water, deionized water, distilled water, spring water, water with up to 10 weight percent based on the total solution of a non-toxic salt, or combinations thereof.

12. The method of claim 11, wherein the non-toxic salt is sodium chloride, potassium chloride or combinations thereof.

13. The method of claim 1, further comprising using a residence time in the low pressure of less than 120 minutes.

14. The method of claim 1, further comprising using a residence time in the low pressure press of less than 3 minutes for the door assemblage when the press temperature is from 100 degrees Fahrenheit to 250 degrees Fahrenheit.

15. The method of claim 1, wherein the back skin and the front skin are simultaneously contacted with the rapid curing water initiated adhesive on the door frame assembly.

* * * * *